Dec. 13, 1960     E. E. LAKSO     2,964,164
ELEVATING CONVEYOR
Filed June 6, 1958     2 Sheets-Sheet 1
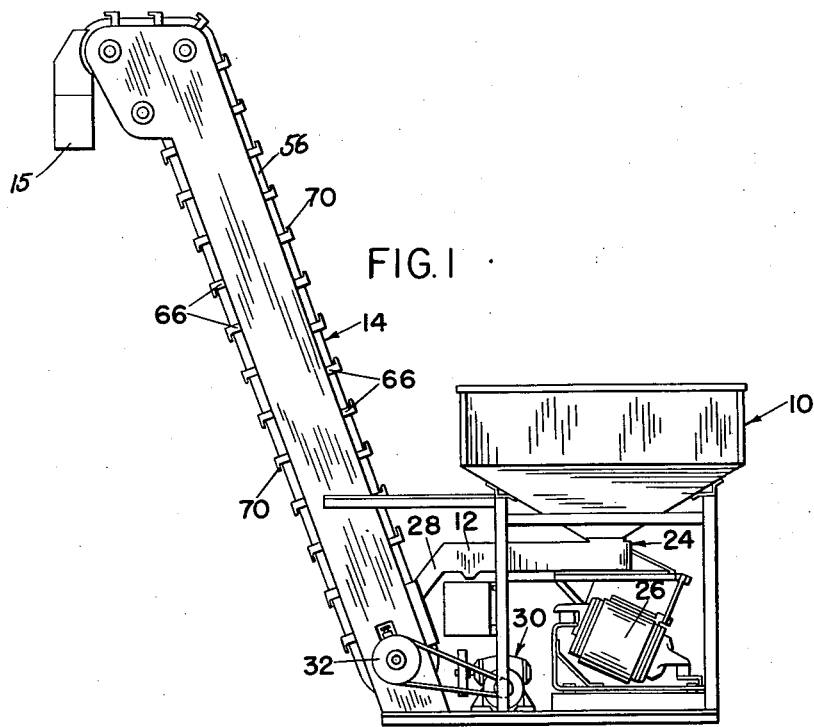
FIG. I
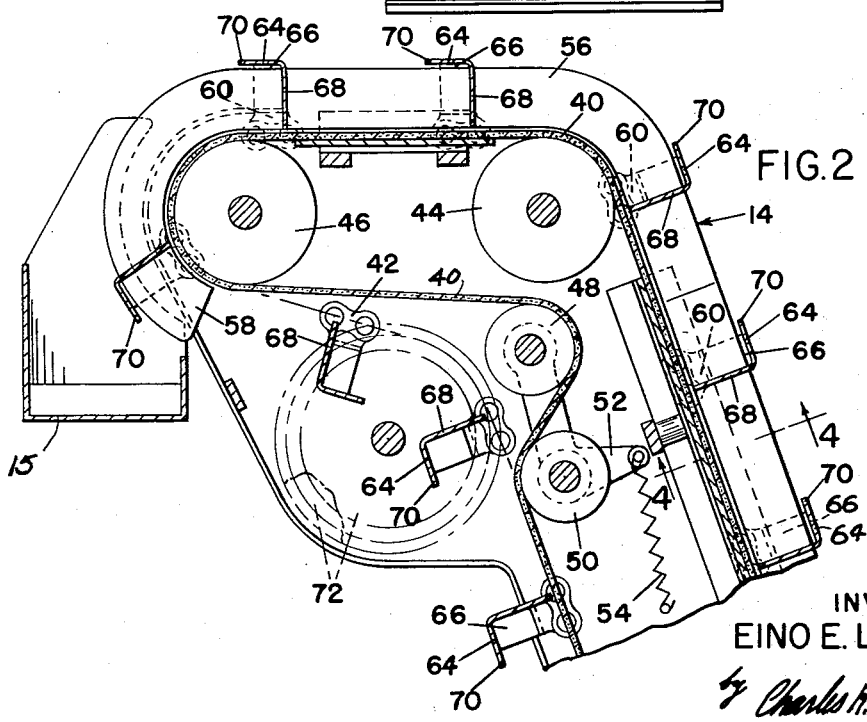
FIG. 2
INVENTOR
EINO E. LAKSO
by Charles R. Fay
ATTORNEY Dec. 13, 1960 E. E. LAKSO 2,964,164
ELEVATING CONVEYOR
Filed June 6, 1958 2 Sheets-Sheet 2
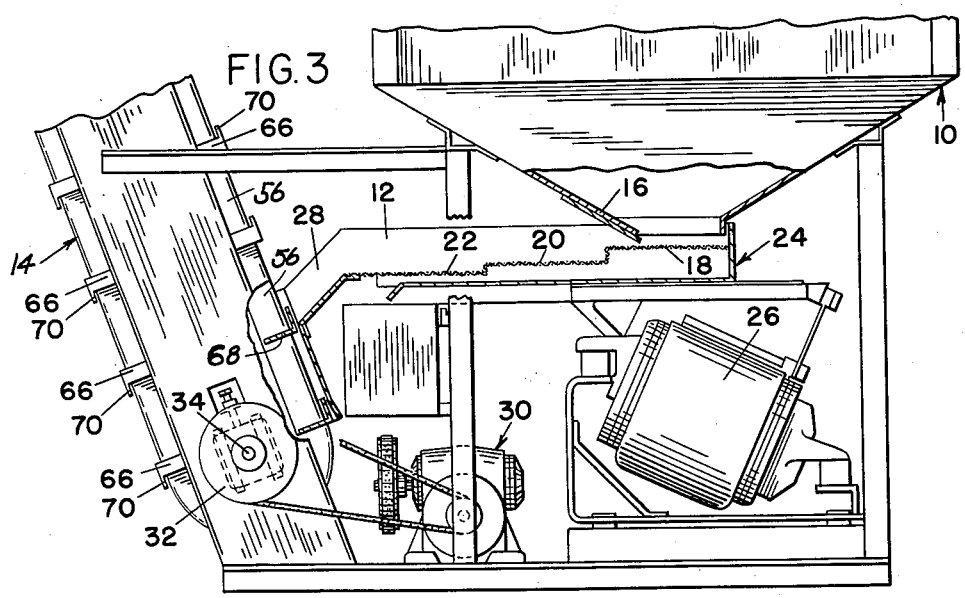
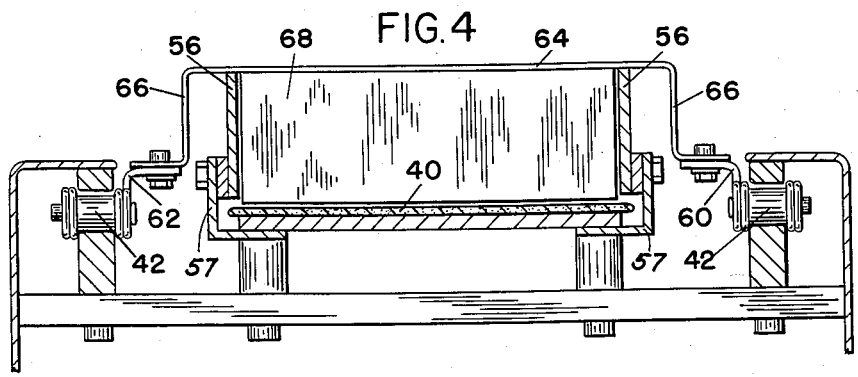
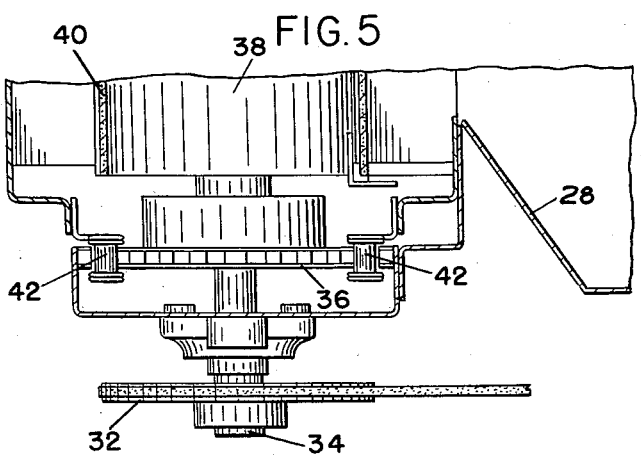
INVENTOR
EINO E. LAKSO
ATTORNEY

# United States Patent Office 2,964,164
Patented Dec. 13, 1960

2,964,164

ELEVATING CONVEYOR

Eino E. Lakso, Fitchburg, Mass., assignor to The Lakso Company Incorporated, Fitchburg, Mass., a corporation of Massachusetts Filed June 6, 1958, Ser. No. 740,400

1 Claim. (Cl. 198—164)

This invention relates to a new and improved elevating conveyor, and the principal object of the invention resides in the provision of a novel conveyor construction for increasing the capacity of the same over prior art conveyors to elevate larger quantities of materials faster and generally within the same confines and dimensions of elevators in the prior art.

Further objects of the invention reside in the provision of an elevating conveyor comprising in general two cooperating but separate moving parts, one of which is in the nature of a flat belt forming a bottom or side wall for each of a series of elevating buckets, and the second element being in general a cleat which is independently mounted and driven and is not directly connected with the belt in any way but moves generally at the same speed therewith and provides for a much larger bucket or elevating mechanism of greater capacity than would otherwise be possible; and the provision of a separately driven belt and a chain driven series of cleats cooperating therewith to increase the capacity of the elevator.

Further objects of the invention include the provision of a simplified construction which provides for an increase in the amount of material which is elevated by the conveyor, and in details of construction of the cleat, and in means for traveling the same along with the flat belt above referred to, together with belt tightening means and separate cleat chain tightening means, to be more fully described.

Other objects and advantages of the invention will appear hereinafter.

Reference is to be had to the accompanying drawings, in which

Fig. 1 is a view in side elevation of a machine according to the invention;

Fig. 2 is an enlarged sectional view showing the upper end of the conveyor;

Fig. 3 is an enlarged sectional view showing the lower end of the conveyor;

Fig. 4 is a section on line 4—4 of Fig. 2 illustrating the construction of the cleat and the channel section for the conveyor; and Fig. 5 is a detail of the pulley and sprocket drive, parts being in section.

In carrying out the present invention, the same will be seen in Fig. 1 to comprise in general a hopper 10 of more or less conventional construction, into which the material to be conveyed upwardly is introduced by any desired means, such as a preliminary conveyor or by production directly from the machine producing the material to be elevated. The material issues from the hopper downwardly onto a transfer mechanism 12 best shown in Fig. 3, thence to the conveyor itself generally indicated at 14. The material is carried up the conveyor to the top portion thereof as illustrated in Fig. 2 where it is dumped individually into further processing machines, sorting apparatus, packaging machines, etc., or in any place desired. In this case, the final receptacle for the elevated material is indicated as a bin or the like 15.

Referring now to Fig. 3, the hopper 10 is seen to be provided with a baffle 16 which depends at an angle to the horizontal in close association with the top step 18 of a step screen having an intermediate step 20 and lowermost step 22. This screen is mounted in what amounts to a box generally indicated at 24 and this entire box and screen is rapidly vibrated by a commercial vibratory mechanism indicated by the reference numeral 26 so that the material passing the baffle 16 from the hopper progresses to the left in Fig. 3 along the various steps but in a relatively thin layer as determined by the baffle 16. As the material progresses to the left in this figure, it tumbles down onto the lower steps. Where small articles such as tablets are being transferred, they are in general turned over, and any dust or broken pieces fall through the screen and are collected in a detritus pan below.

The numeral 28 indicates a converging chute. The screen is for instance twelve inches wide and the chute narrows down to a half that distance, see Fig. 5, so that the material is concentrated laterally to a narrower condition, whereby the material is condensed in width and increased in height as it is presented to the conveyor for elevation thereof.

A motor generally indicated at 30 is provided with necessary gear reduction devices and by this means is adapted to drive a pulley 32. This pulley drives a shaft 34 on which is mounted a sprocket 36 and a pulley 38. The pulley 38 travels an endless flat belt 40 and the sprocket 36 which is duplicated at the opposite end of shaft 34, drives a pair of endless chains 42, 42, one at each side of the belt 40 as clearly shown in Fig. 4.

Referring now to Fig. 2, it will be seen that the path of the belt 40 is upwardly on an incline according to the conveyor frame, and then forwardly over an idler 44, down around an idler 46, and reversely around a pair of rolls at 48 and 50 which act as take-up devices and keep the belt under the proper tension. Rolls 48 and 50 are mounted on a bell-crank 52 which is maintained under spring tension as by a spring 54.

The upwardly-inclined frame of the machine besides providing a framework for the rolls mentioned above, also provides a support for a pair of spaced, parallel side members 56, 56 which extend generally from the chute at 28, or thereabouts, upwardly in general conformance to the path of the belt as described, and terminating at 58 (Fig. 2), at which point the articles being elevated have been dumped from the conveyor. The members 56 lie one at each side of belt 40 in close association therewith, and are mounted on suitable brackets 57, see Fig. 4. It will be seen that the belt 40 and the side members 56, 56 form an inclined trough wihch extends upwardly and terminates as stated, the belt 40 returning in an endless path to the chute 28. The side members 56, 56 are only as long as needed for the elevating function.

The chains 42, 42 have mounted at spaced intervals thereon pairs of brackets 60, 62 (see Fig. 4) and on each pair of these brackets there is mounted in the form of a bridge a flat cleat member 64 which is provided with end legs 66, 66 secured to brackets 60 and 62. These cleat members lie generally parallel to the belt at the elevating run thereof, and form side walls for the individual buckets of the conveyor, as will be more apparent hereinafter. An integral, turned down, depending flat member 68 forms the bottom of each bucket.

The member 68 fits within the area of the trough formed by traveling belt 40 and fixed side members 56, 56, and it will be seen that each bucket has a forward portion 70, a part of cleat member 64, which extends upwardly beyond the legs 66 and increases the depth of the buckets. It is to be noted that each bucket comprises a bottom 68, a forward wall (belt 40), a rear wall 64, 70, and side walls 56, 56.

The chains and the cleats follow the path and travel at the same speed along the incline with belt 40 and also pass over idlers (not shown) corresponding to those at 44 and 46. However, as soon as the material being conveyed is dumped, the chains and cleats then depart from the path of the belt and pass in depending relation between a pair of idler or tightener sprockets 72, thence passing downwardly once again to sprockets 36 to once more join the path of travel of the traveling belt 40.

By this construction, a very simple series of elevating buckets are provided. These buckets are of an extremely large capacity as compared to mere cleats which might be secured to the belt 40. Furthermore, such construction avoids the use of tilted buckets such as are common in the prior art and by reason of the construction at the take-up rolls 48, 50 and sprockets 72, required tension is maintained at all times on both the belt 40 and the sprocket chains in order to smoothly carry out the elevation of the materials involved.

Having thus described my invention and the advantages thereof, I do not wish to be limited to the details herein disclosed, otherwise than as set forth in the claim, but what I claim is:

An elevating conveyor comprising a framework, a belt, means mounting the belt for travel therealong in a generally upward direction, idle rolls for said belt directing said belt downwardly, a pair of endless driving means one such means being at each side of the belt, a series of cleats, each cleat having extending spaced end legs secured to said driving means and bridging said belt, each cleat comprising a part generally normal to said belt in the elevating run thereof and another part generally parallel to but spaced from said belt, spaced side barriers one at each side of the belt and extending generally normal thereto, the cleats traveling within and between said barriers in close proximity to said belt and said barriers, said driving means and said cleats departing from the path of said belt adjacent the idle rolls, means guiding the cleats to again conform to the path of the belt, the spaced end legs of the cleats also bridging the barriers, the latter being located close to the belt at the edges thereof and between the said endless cleat driving means.

References Cited in the file of this patent
UNITED STATES PATENTS

| | | |
|---|---|---|
| 1,570,235 | Fooks | Jan. 19, 1926 |
| 2,546,512 | Lewis | Mar. 27, 1951 |
| 2,815,116 | Erickson | Dec. 3, 1957 |

FOREIGN PATENTS

| | | |
|---|---|---|
| 395,031 | Great Britain | July 13, 1933 |